Figure 1:
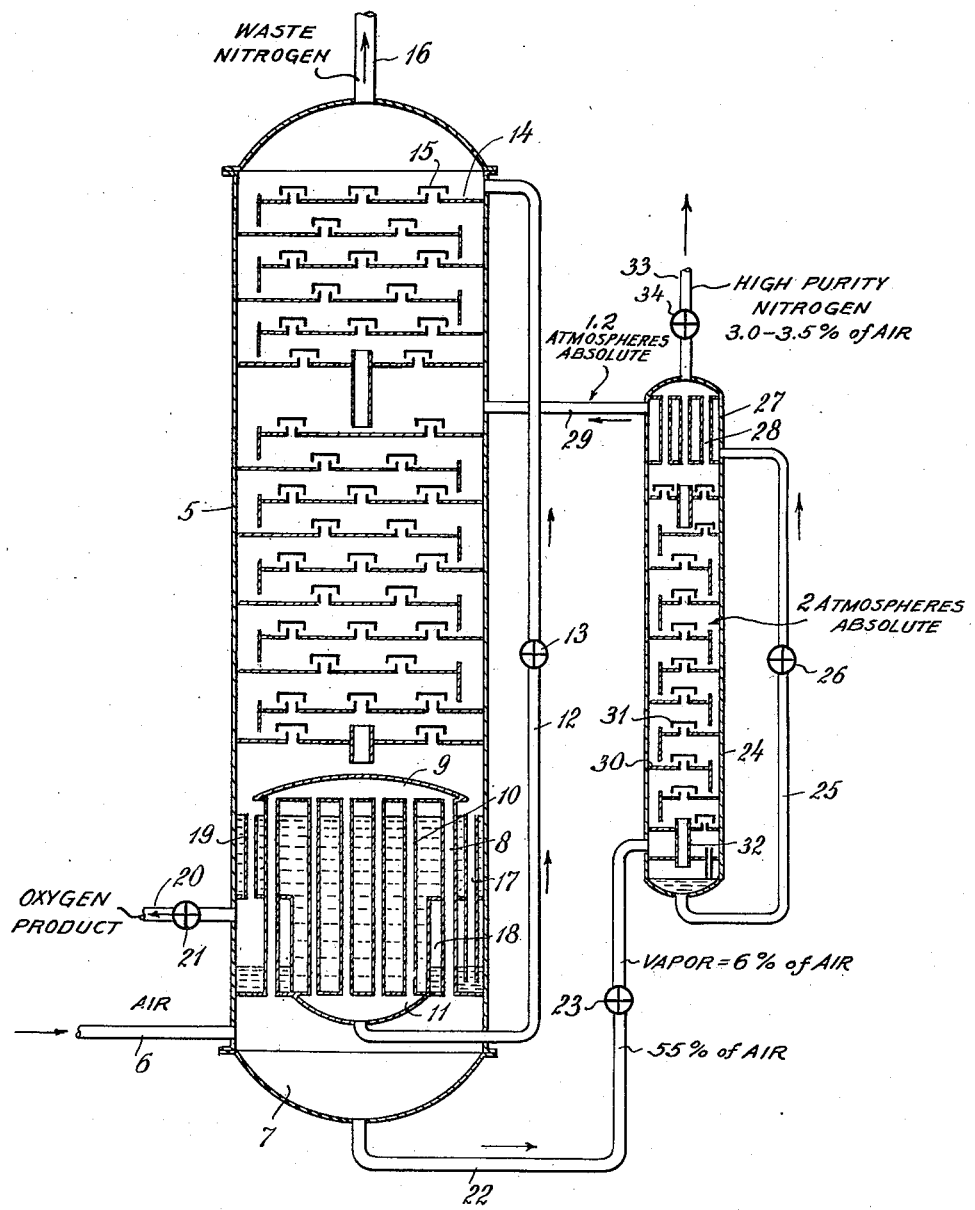

April 2, 1940. J. L. SCHLITT 2,195,976
SEPARATION OF THE CONSTITUENTS OF GASEOUS MIXTURES
Filed April 30, 1937 3 Sheets-Sheet 1

INVENTOR
Joseph L. Schlitt
BY
ATTORNEYS

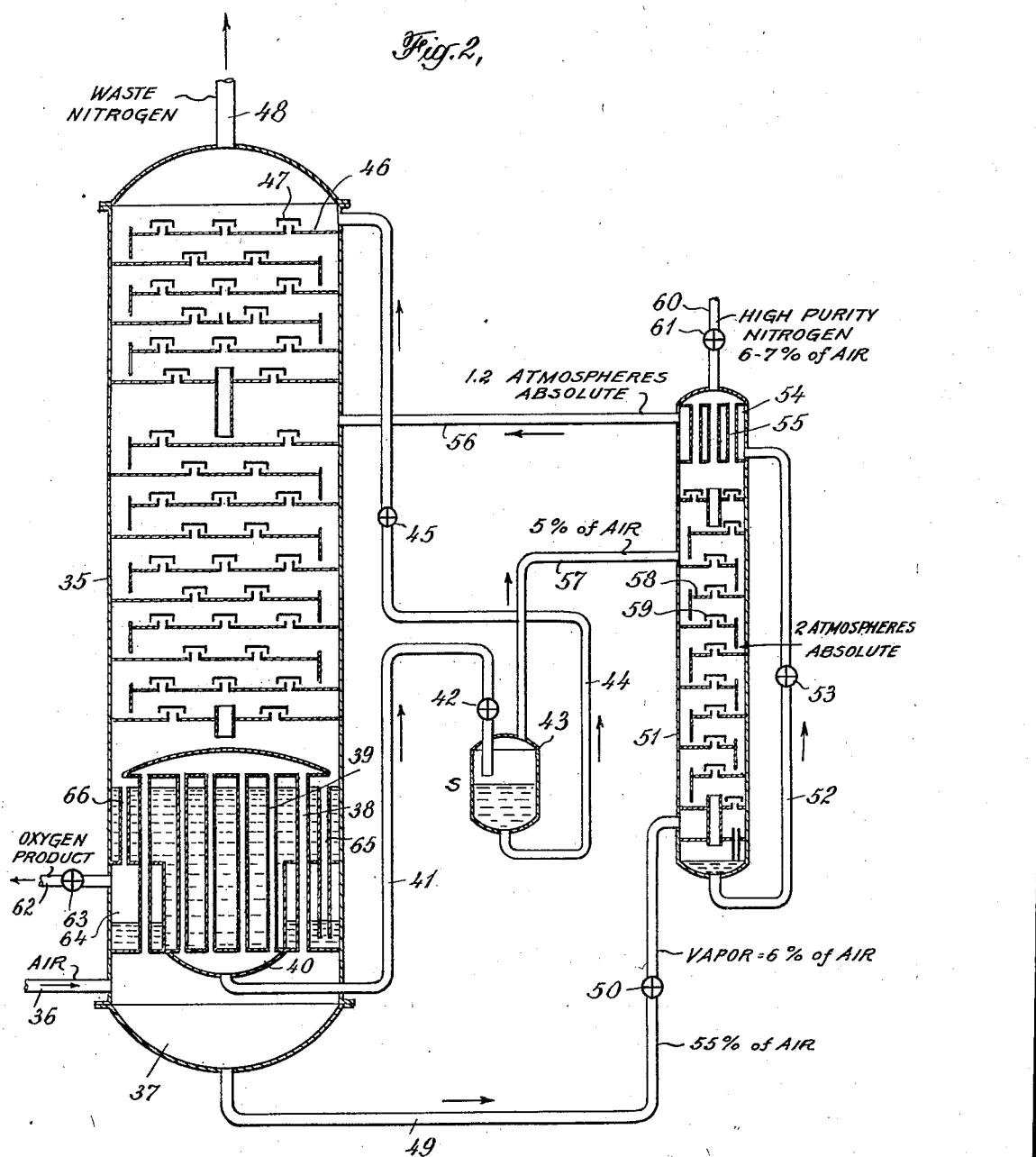

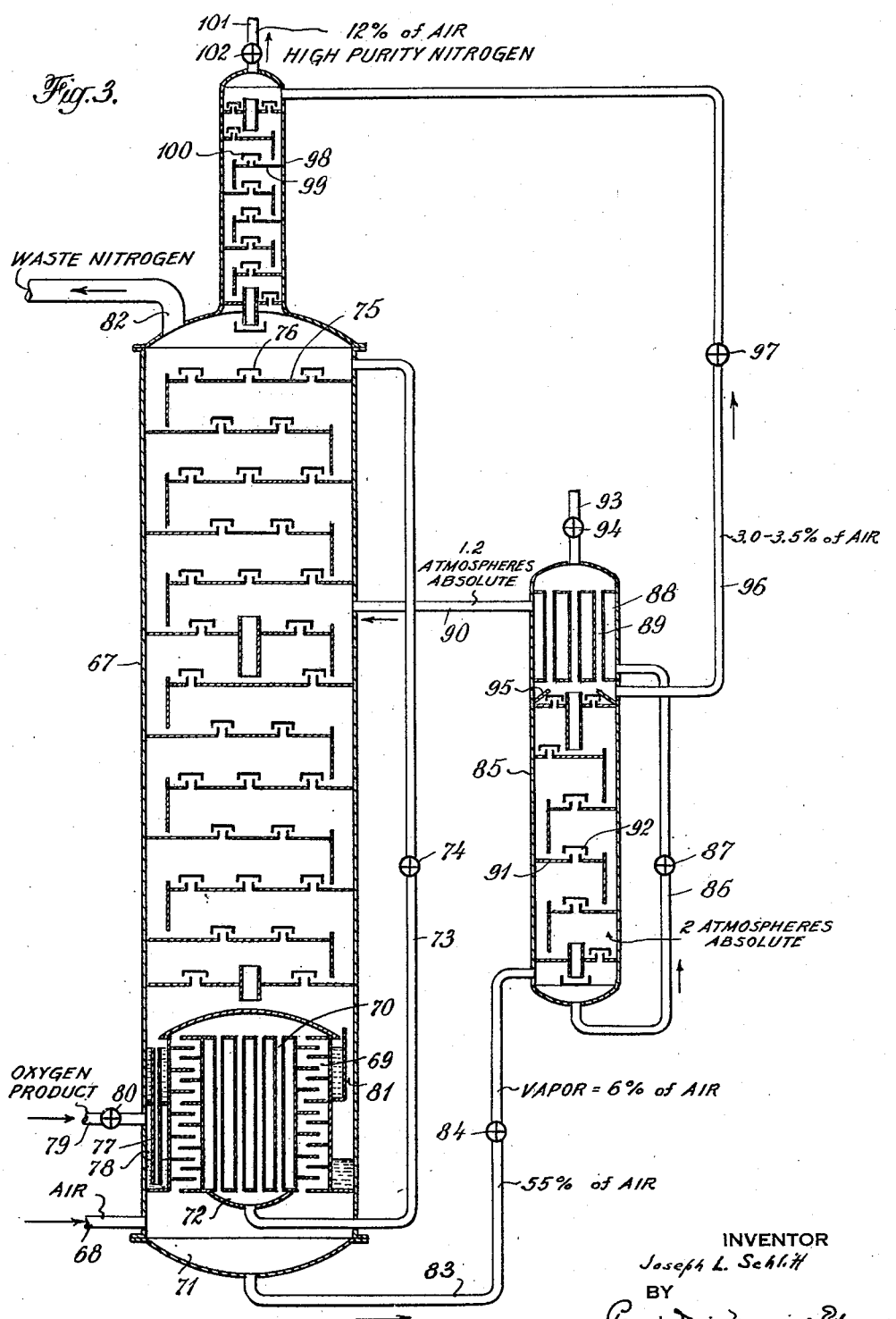

Patented Apr. 2, 1940

2,195,976

UNITED STATES PATENT OFFICE 2,195,976

SEPARATION OF THE CONSTITUENTS OF GASEOUS MIXTURES

Joseph L. Schlitt, Darien, Conn., assignor to Air Reduction Company, Incorporated, New York, N. Y., a corporation of New York Application April 30, 1937, Serial No. 139,892

14 Claims. (Cl. 62—175.5)

This invention relates to the separation of the constituents of gaseous mixtures, and more particularly to the recovery of nitrogen in a state of high purity in conjunction with the separation of oxygen from the atmosphere.

The separation and recovery of oxygen from the atmosphere by liquefaction and rectification is well known and is widely used. In operating the standard methods of recovering oxygen, the best performance in commercial plants today is represented by a recovery of about 95% of the oxygen present in the atmosphere. The waste nitrogen contains at least 1% of oxygen. This loss of oxygen and consequent contamination of the nitrogen product is unavoidable where oxygen of high purity is desired, because of inherent characteristics of the rectification operation which do not permit an exact separation of the two major constituents of the atmosphere. For many purposes, nitrogen containing 1% or more of oxygen meets all requirements, but there is in industry a steady and increasing demand for large volumes of high purity nitrogen, and the existing plants as equipped today cannot meet this demand.

It is the object of the present invention to afford a simple and satisfactory method of separating high purity nitrogen in conjunction with the recovery of oxygen, also of high purity, at very slight if any increased cost, so that the requirements of industry may be met by a relatively slight modification of the existing oxygen plants.

A further object of the invention is the provision of a method whereby a portion of the nitrogen of the atmosphere may be recovered in a state of high purity without disturbing the normal operation of the method of separating oxygen likewise of high purity, the operation being easily controllable and involving no elaborate modification of the existing plants.

Other objects and advantages of the invention will be better understood by reference to the following specification and accompanying drawings, in which Fig. 1 is a diagrammatic illustration of an apparatus adapted to effect the desired result;

Fig. 2 is a similar view illustrating a slightly different apparatus involving the same principles but adapted to provide a large amount of high purity nitrogen; and Fig. 3 is a diagrammatic view illustrating a further modification permitting the recovery of even greater proportions of high purity nitrogen.

In carrying out the invention, the usual form of apparatus for the separation of oxygen from the atmosphere may be employed. For the purpose of illustration, I shall refer to an apparatus of the well known Claude type, although the equally well known Linde apparatus and similar oxygen columns may be adapted for use in accordance with the invention. No substantial change is made in the operation of the oxygen column per se. In recovering high purity nitrogen, vapor derived from liquid products of the oxygen column as the result of throttling from higher to lower pressures is subjected to rectification and selective condensation, and in one case the yield of high purity oxygen may be augmented by treating a portion of the effluent nitrogen from the column to rectification and combining the resulting high purity nitrogen with that derived from the vapor hereinbefore mentioned. As a result of the procedure hereinafter described in more detail, I am able to recover high purity nitrogen in the proportion of from 3% to 12% or more of the nitrogen present in the air which is initially supplied to the oxygen column. This high purity nitrogen contains less than .1% of oxygen and only a small trace of argon, and is adapted for numerous commercial uses for which nitrogen containing 1% or more of oxygen can not be used satisfactorily.

Since, as hereinbefore indicated, the oxygen column and its operation are not modified substantially, and since also the volume of vapor treated is relatively small, the auxiliary apparatus required is simple, inexpensive and requires very little additional space. It is not necessary to provide additional compressors and exchangers, so that the additional equipment required for the application of the present invention is reduced to a minimum, and its cost, as compared with the advantageous result secured, is insignificant. The resulting high purity nitrogen output is a valuable product which has not been commercially available heretofore. It has been possible, of course, to operate a column so as to produce high purity nitrogen, but in that case the purity of the oxygen is sacrificed and the cost of the nitrogen is increased owing to the necessity for discarding oxygen for which there has been no commercial demand. The primary purpose of the present invention, as I have indicated, is to permit recovery of both oxygen and nitrogen of high purity in a single continuous operation, a result which so far as I am aware has not been obtainable in any commercial plant.

Referring to Fig. 1 of the drawings, 5 indicates a column to which air, after initial compression to the desired pressure and cooling in the usual exchangers, is introduced through a pipe 6 which delivers the air to a compartment 7. The air passes upwardly through tubes 8 in heat exchange relation with liquid products surrounding the tubes. The resulting partial liquefaction with backward return of the liquid products causes accumulation of liquid in the compartment 7, which is rich in oxygen and constitutes approximately 55% of the air treated. The balance of the air passes into a head 9 and thence downwardly through tubes 10 likewise surrounded by liquid products. The resulting heat exchange causes the residue of the air to be liquefied. The liquid flows into a compartment 11 and consists principally of nitrogen. This liquid is delivered through a pipe 12 and expansion valve 13 to the top of the column 5 and flows downwardly over trays 14 which are provided with the usual hats 15 in contact with vapors rising through the column. The resulting rectification of the vapors and liquid causes a separation of the effluent waste nitrogen which escapes through the pipe 16 and the enrichment of the liquid in oxygen which eventually accumulates in the compartment surrounding the tubes 8 and 10. This liquid overflows through a pipe 17 into a lower compartment 18 where the liquid is vaporized by heat exchange with the air passing through the tubes 8. A portion of the vapor rises through the tube 19 into the upper compartment of the column, and the balance is withdrawn through a pipe 20 and valve 21 as the oxygen product. This product in the normal operation of an oxygen column is substantially free from nitrogen and argon.

In the usual oxygen column the liquid from the compartment 7 is withdrawn and delivered through a pipe and pressure-reducing valve to an intermediate level of the rectification column where it joins the descending liquid and is rectified by the vapors rising through the column. The resulting liquid forms the major portion of the liquid which eventually surrounds the tubes 8 and 10. In accordance with the present invention, the liquid from the compartment 7 is withdrawn through a pipe 22 and passes through an expansion valve 23 where the pressure is reduced from the initial pressure of the entering air to approximately two atmospheres absolute. As the result of the expansion, a portion of the liquid is vaporized. The amount of vapor thus available constitutes about 6% of the air treated. The liquid and vapor are delivered to the lower end of an auxiliary column 24. The liquid portion is withdrawn from the bottom of the column by a pipe 25, passes through an expansion valve 26 where the pressure is further reduced to approximately 1.2 atmospheres absolute. The resulting vapor and liquid are delivered to a condenser 27 at the upper end of the auxiliary column 24, where they surround a plurality of tubes 28. After passing through the condenser, the vapor and liquid are delivered by a pipe 29 to an intermediate level of the column 5, where they are rectified in the manner hereinbefore described.

The vapor entering the bottom of the column 24 passes upwardly through a plurality of trays 30 having the usual hats 31 and finally enters the tubes 28 of the condenser. Owing to the difference in temperature resulting from the reduced pressure of the liquid surrounding the tubes 28, condensation of any oxygen present in the rising vapor occurs. The liquid thus produced flows backwardly over the trays 30 in contact with the rising vapors. The liquid finally overflows through a pipe 32 and joins the liquid in the pipe 25. The effluent from the auxiliary column escaping through a pipe 33 controlled by a valve 34 is substantially pure nitrogen, that is to say, it contains less than .1% of oxygen and only small traces, if any, of argon. This effluent may constitute from 3% to 3.5% of the air entering the column 5.

In Fig. 2 of the drawings, 35 indicates the column to which air, after initial compression and cooling, is introduced through a pipe 36 to a compartment 37. The air passes upwardly through tubes 38 and the residue passes downwardly through tubes 39 of the condenser, with the resulting separation of the air into a liquid substantially enriched in oxygen which accumulates in the compartment 37 and a liquid consisting principally of nitrogen which accumulates in the compartment 40. The latter liquid is withdrawn through a pipe 41 and passes through an expansion valve 42 and thence into a separator 43 where the resulting vapor separates from the liquid. The liquid component is delivered by a pipe 44 through an expansion valve 45 to the top of the column 35 and passes downwardly over trays 46 having the usual hats 47 for rectification in the well known manner. The waste nitrogen escapes from the top of the column through a pipe 48.

The liquid from the compartment 37 is withdrawn through a pipe 49 and passes through expansion valve 50 where the pressure is reduced to approximately two atmospheres absolute. The expansion results in the separation of vapor from the liquid. The liquid component is withdrawn from the bottom of an auxiliary column 51 through a pipe 52, and is delivered through an expansion valve 53 where the pressure is reduced to approximately 1.2 atmospheres absolute. The liquid and vapor pass through a condenser 54 surrounding tubes 55 at the top of the auxiliary column 51, and thence through a pipe 56 to an intermediate level of the column 35 where it joins the liquids and vapors undergoing rectification. Vapors from the separator 43 are delivered through a pipe 57 to an intermediate level of the auxiliary column 51. The vapors rising through the auxiliary column are subjected to condensation in the tubes 55 and the resulting liquid flows downwardly over trays 58 having the usual hats 59. The resulting rectification followed by condensation produces a liquid containing all of the oxygen and any argon which joins the liquid in the pipe 52. The residue, consisting of high purity nitrogen, escapes through a pipe 60 controlled by a valve 61 and constitutes the high purity nitrogen product which may constitute from 6% to 7% of the air treated. The other product, pure oxygen, is withdrawn through a pipe 62 controlled by a valve 63. This product results from vaporization of liquid in the compartment 64 which is fed with liquid through an overflow pipe 65. A portion of the vapor in this compartment rises into the upper compartment of the column 35 through a tube 66.

Another modification of the invention is illustrated in Fig. 3 in which a column 67 is supplied with air after initial compression and cooling through a pipe 68. The air is separated by passing upwardly through a passage 69 and then downwardly through tubes 70 in heat exchange relation with a liquid product of the rectification into a liquid rich in oxygen which accumulates in the compartment 71 and a liquid rich in nitrogen which accumulates in the compartment 72. The latter liquid passes upwardly through a pipe 73 and pressure expansion valve 74 into the top of the column 67. It flows downwardly over trays 75 having the usual hats 76 with resulting rectification and the formation of a liquid which overflows through a tube 77 into a compartment 78. Vapor is withdrawn from this compartment through a pipe 79 and valve 80, and constitutes the oxygen product of the operation. A portion of the vapor rises through a passage 81 and takes part in the rectification. The effluent waste nitrogen escapes through a pipe 82 from the top of the column.

Liquid accumulating in the compartment 71 is withdrawn through a pipe 83 and passes through an expansion valve 84 where the pressure is reduced to approximately two atmospheres absolute. The resulting liquid and vapor are delivered to an auxiliary column 85, the vapor passing upwardly therein while the liquid is delivered through a pipe 86 and pressure reducing valve 87 wherein the pressure is reduced again to approximately 1.2 atmospheres absolute. The liquid and vapor pass then into a condenser 88 surrounding tubes 89 and thence through a pipe 90 into an intermediate level of the column 67 where the liquid and vapors join the rectification.

The vapor from the valve 84 passes upwardly through trays 91 having the usual hats 92 and finally into the tubes 89 of the condenser. Oxygen present in the vapors is thus accumulated in the descending liquid which escapes through the pipe 86. A pipe 93, controlled by a valve 94, is provided at the top of the auxiliary column, but in this case it is not employed normally for the withdrawal of nitrogen. The nitrogen is liquefied in the tubes 89, flows backwardly and a portion thereof is caught in a tray 95. This liquid is delivered through a pipe 96 and pressure reducing valve 97. The pressure is reduced at this point to approximately 1.2 atmospheres absolute, and the resulting liquid and vapors enter the top of a rectifier 98 provided with trays 99 having the usual hats 100. The liquid flows downwardly over the trays in contact with vapors from the top of the column 67. The resulting rectification of these vapors by contact with the rich nitrogen liquid supplied through the pipe 96 results in an increased output of high purity nitrogen amounting to 12% or more of the air entering the column 67. This high purity nitrogen escapes through a pipe 101 controlled by a valve 102 and constitutes the high purity nitrogen product of the operation.

As will be readily understood, the method in its several modifications as hereinbefore described permits the commercial recovery of both high purity oxygen and high purity nitrogen, the latter in considerable volume, in a single operation, without the necessity for recompression or elaborate exchanger systems. The oxygen column operates substantially in the usual manner, so that the equilibrium therein necessarily maintained in order to produce a satisfactory oxygen product is not disturbed. Advantage is taken of the separation resulting from throttling to separate nitrogen in substantial purity. The additional rectification required involves the addition only of relatively simple and compact auxiliary apparatus which is readily controlled. No additional power consumption is involved because the initial compression of the air may be that normally employed in oxygen recovery systems.

As hereinbefore indicated, the invention may be applied to any of the well known methods of recovering oxygen by liquefaction and rectification, by simply providing the necessary auxiliary apparatus and operating it in the manner described.

While the invention has been described with reference more particularly to the separation of oxygen and nitrogen from the atmosphere, it may be employed similarly to recover two constituents in substantial purity from other gaseous mixtures.

Various changes may be made in the form, arrangement and construction of the apparatus without departing from the invention or sacrificing any of its advantages, the diagrammatic drawings being illustrative merely of the method and its application. Various parts which are well known in the art, such as the compressors, exchangers, etc., are omitted for purposes of clarity.

I claim:

1. The method of separating the constituents of gaseous mixtures which comprises initially separating the gaseous mixture into liquid fractions in which the major constituents are respectively concentrated, throttling one of the liquid fractions to a lower pressure, rectifying the resulting vapors to secure a gas consisting of one of the constituents in substantial purity, rectifying the residual liquid fractions to separate the other major constituent in substantial purity, liquefying the gas consisting of one of the constituents in substantial purity and rectifying a portion of the vapor from the second rectification with that liquid to increase the output of the pure gaseous constituent thereof.

2. The method of separating oxygen and nitrogen from air which comprises initially separating the gaseous mixture into liquid fractions in which nitrogen and oxygen are respectively concentrated, throttling the liquid fraction in which oxygen is concentrated to a lower pressure, rectifying the resulting vapors to secure a gas consisting of substantially pure nitrogen, rectifying the residual liquid fractions to separate substantially pure oxygen, liquefying the substantially pure nitrogen and rectifying a portion of the vapor from the second rectification with that liquid to increase the output of substantially pure nitrogen.

3. The method of separating the constituents of gaseous mixtures which comprises initially separating the gaseous mixture into liquid fractions in which the major constituents are respectively concentrated, throttling one of the liquid fractions to a lower pressure, rectifying the resulting vapors to secure a gas consisting of one of the constituents in substantial purity, throttling the liquid product of the rectification to a lower pressure, utilizing the cold liquid to cool the effluent from the rectification, thereby providing a reflux liquid, and rectifying the residual liquid fractions to separate the other major constituent in substantial purity.

4. The method of separating the constituents of gaseous mixtures which comprises initially separating the gaseous mixture into liquid fractions in which the major constituents are respectively concentrated, throttling both of the liquid fractions to a lower pressure, rectifying the vapors resulting from the throttling of one of said liquid fractions to secure a gas consisting of one of the constituents in substantial purity, throttling the liquid product of said rectification to a lower pressure, utilizing the cold liquid to cool the effluent from the rectification, thereby providing a reflux liquid, and rectifying the residual liquid fractions to separate the other major constituent in substantial purity.

5. The method of separating the constituents of gaseous mixtures which comprises initially separating the gaseous mixture into liquid fractions in which the major constituents are respectively concentrated, throttling one of the liquid fractions to a lower pressure, rectifying the resulting vapors to secure a gas consisting of one of the constituents in substantial purity, throttling the liquid product of the rectification to a lower pressure, utilizing the cold liquid to cool the effluent from the rectification, thereby providing a reflux liquid, rectifying the residual liquid fractions to separate the other major constituent in substantial purity, liquefying the gas consisting of one of the constituents in substantial purity and rectifying a portion of the vapor from the second rectification with that liquid to increase the output of the pure gaseous constituent thereof.

6. The method of separating oxygen and nitrogen from air which comprises initially separating the gaseous mixture into liquid fractions in which nitrogen and oxygen are respectively concentrated, throttling the liquid fraction in which oxygen is concentrated to a lower pressure, rectifying the resulting vapors to secure a gas consisting of substantially pure nitrogen, throttling the oxygen-containing liquid product of the rectification to a lower pressure, utilizing the cold liquid to cool the effluent from the rectification, thereby producing a reflux liquid, and rectifying the residual liquid fractions to separate substantially pure oxygen.

7. The method of separating oxygen and nitrogen from air which comprises initially separating the gaseous mixture into liquid fractions in which nitrogen and oxygen are respectively concentrated, throttling the liquid fractions in which oxygen and nitrogen are respectively concentrated to a lower pressure, rectifying the vapors resulting from the throttling of the liquid fraction in which oxygen is concentrated to secure a gas consisting of substantially pure nitrogen, throttling the oxygen-containing liquid product of the rectification to a lower pressure, utilizing the cold liquid to cool the effluent from the rectification thereby producing a reflux liquid and rectifying the residual liquid fractions to separate substantially pure oxygen.

8. The method of separating oxygen and nitrogen from air which comprises initially separating the gaseous mixture into liquid fractions in which nitrogen and oxygen are respectively concentrated, throttling the liquid fraction in which oxygen is concentrated to a lower pressure, rectifying the resulting vapors to secure a gas consisting of substantially pure nitrogen, throttling the oxygen-containing liquid product of the rectification to a lower pressure, utilizing the cold liquid to cool the effluent from the rectification, thereby producing a reflux liquid, rectifying the residual liquid fractions to separate substantially pure oxygen, liquefying the substantially pure nitrogen and rectifying a portion of the vapor from the second rectification with that liquid to increase the output of substantially pure nitrogen.

9. The method of separating oxygen and nitrogen from air which comprises liquefying the air by thermal contact with the oxygen product in the liquid state, throttling one part of the product of the liquefaction to a lower pressure, rectifying as a separate fraction the vapor formed as a result of said throttling to secure a gas consisting of substantially pure nitrogen, throttling another part of the product of the initial liquefaction to a lower pressure, and rectifying the residual liquid fractions so as to separate them into substantially pure oxygen, and nitrogen containing only small percentages of oxygen.

10. The method of separating the constituents of gaseous mixtures which comprises separating such mixtures under presure into liquid fractions in which the major constituents are respectively concentrated, throttling one of the liquid fractions to a lower pressure, rectifying the vapors resulting from said throttling to secure a gas consisting of one of the constituents in substantial purity, liquefying a portion of the rectified vapors, utilizing at least a portion of the resultant liquid as the liquid rectifying medium in said rectification, and rectifying the residual liquid fraction of said rectification to separate another major constituent in substantial purity.

11. The method of separating the constituents of a gaseous mixture which comprises separating the gaseous mixture by liquefaction under pressure into two liquid fractions, separately throttling both of said liquid fractions to lower pressures, rectifying the vapors resulting from said throttlings, liquefying a portion of the vapors resulting from both of said throttlings after they have been rectified to secure a gas consisting of one of the major constituents in substantial purity and liquid fractions, utilizing at least a portion of said last-named liquid fractions as the liquid rectifying medium in said rectifications, and rectifying the residual liquid fractions from said rectifications to separate another major constituent in substantial purity.

12. The method of separating oxygen and nitrogen from air which comprises separating it by liquefaction under pressure into two liquid fractions in which oxygen and nitrogen are respectively concentrated, throttling the liquid fraction in which oxygen is concentrated to a lower pressure, separating from the residual liquid the vapor resulting from that throttling, separately rectifying that vapor to secure a fraction consisting of substantially pure nitrogen and rectifying the residual liquid fractions to separate substantially pure oxygen.

13. The method of a separating oxygen and nitrogen from air which comprises separating from air under pressure two fractions in which nitrogen and oxygen are respectively concentrated, the fraction in which oxygen is concentrated being in the liquid state, throttling that liquid fraction to a lower presure, separating from the residual liquid the vapors resulting from said throttling, rectifying said vapors to secure a gas consisting of substantially pure nitrogen, liquefying a portion of the rectified vapors, utilizing at least a portion of the resultant liquid as the liquid rectifying medium in said rectification, and rectifying the residual liquid fractions to separate substantially pure oxygen.

14. In the method of separating oxygen and nitrogen from air, the steps which include separating air by liquefaction under pressure into liquid fractions in which oxygen and nitrogen, respectively, are concentrated, throttling one of the liquid fractions to a lower pressure, separating the vapors resulting from said throttling from the residual liquid, rectifying said vapors, liquefying a portion of the rectified vapors, utilizing a portion of the resultant liquid as the liquid rectifying medium in said rectification, separating by rectification all remaining portions of the air, and producing high purity nitrogen by rectifying a portion of the upper vapor product resulting from said separation of the remaining portions of the air with the remainder of said resultant liquid as the rectifying medium.

JOSEPH L. SCHLITT.